United States Patent [19]

Lindsay

[11] 4,012,721
[45] Mar. 15, 1977

[54] DIGITAL LOGIC CIRCUIT FOR A DYNAMIC BUFFER REGISTER

[75] Inventor: Donald S. Lindsay, Waynesboro, Va.

[73] Assignee: General Electric Company, Waynesboro, Va.

[22] Filed: May 23, 1975

[21] Appl. No.: 580,450

[52] U.S. Cl. .................................. 340/172.5
[51] Int. Cl.² ............... G06F 13/02; G11C 9/00; G11C 21/00
[58] Field of Search ............ 445/1; 340/172.5

[56] References Cited

UNITED STATES PATENTS

| | | | |
|---|---|---|---|
| 2,995,729 | 8/1961 | Steele | 340/172.5 |
| 3,116,410 | 12/1963 | La Manna et al. | 340/172.5 |
| 3,404,377 | 10/1968 | Frankel | 340/172.5 |
| 3,438,004 | 4/1969 | Laviron | 340/172.5 |
| 3,495,222 | 2/1970 | Perotto et al. | 340/172.5 |
| 3,623,020 | 11/1971 | Mao | 340/172.5 |
| 3,651,481 | 3/1972 | Evans et al. | 340/172.5 |
| 3,733,588 | 5/1973 | Conn | 340/172.5 |
| 3,750,104 | 7/1973 | Chang | 340/172.5 |
| 3,761,894 | 9/1973 | Pile et al. | 340/172.5 |
| 3,781,807 | 12/1973 | Saltini | 340/172.5 |
| 3,883,855 | 5/1975 | Brightman et al. | 340/172.5 |

Primary Examiner—Gareth D. Shaw
Assistant Examiner—Jan E. Rhoads
Attorney, Agent, or Firm—Michael Masnik

[57] ABSTRACT

Data transfer and control apparatus for coupling between a data source having a first character per second rate of delivery of coded pulse groups each representing a character and a recorder for recording data in blocks of a fixed number of characters at a second character per second rate comprising an incremented data storage register; an incremented tag signal storage register; means for applying coded pulse groups to said register from said source; means for providing tag signals, associated with respective applied coded pulse groups, to said tag signal register; means for incrementing said applied pulse groups and associated tag signals synchronously in their respective registers at a third character per second rate.

10 Claims, 2 Drawing Figures

BLOCK DIAGRAM - RECORDER LOGIC

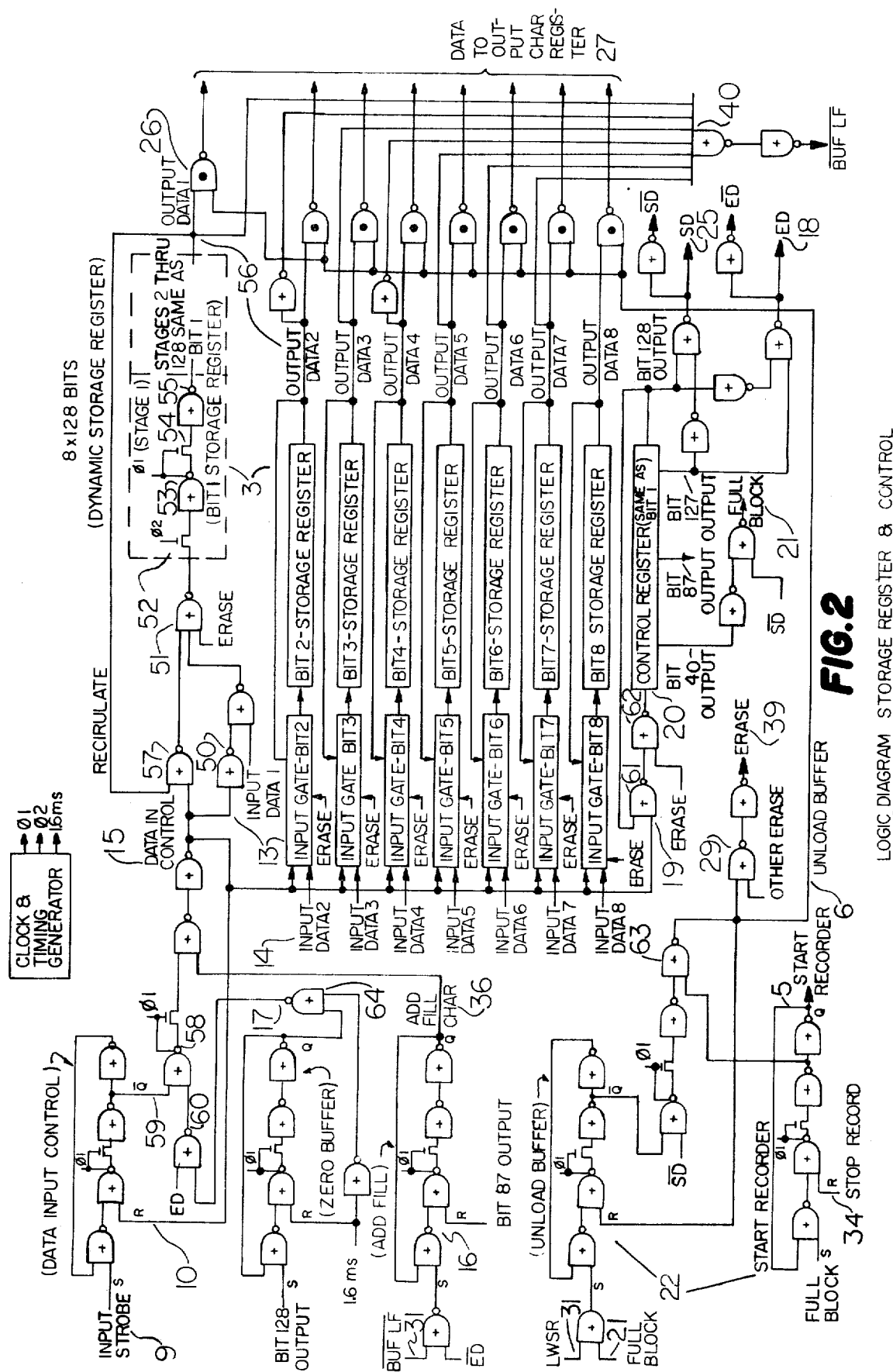
FIG.2 LOGIC DIAGRAM STORAGE REGISTER & CONTROL

DIGITAL LOGIC CIRCUIT FOR A DYNAMIC BUFFER REGISTER

BACKGROUND OF THE INVENTION

The present invention relates to digital data processing and more particularly to a method and apparatus for buffering data prior to recording in block format on a record medium.

Recording of digital data on a record medium such as magnetic tape or punched paper in association with data communication printers is well known. The recording of data in block format allows for editing of the data prior to recording. It also allows higher density recording of data on the medium as opposed to incremental character recording. Where a recorder has to accommodate data available at different incoming data rates, use has been made of buffering stages of one character length, one block length or an integral number of block lengths. One common approach is to employ a single buffer of one block length. The major disadvantage of this approach is that the data source must wait for the recorder to record the block of data before entry of further data. Another common approach is to use two buffers, each of one block length, wherein as one stored block is being used to drive the recorder, data is being entered into the second buffer. Such an arrangement has proved to be relatively expensive because of its relatively inefficient utilization of electronic circuitry. The latter arrangement has also been unsuitable in applications where space is a premium since two full blocks of buffering is employed. Also some form of switching is generally required to couple the source and recorder sequentially to the two buffers.

Accordingly, it is one object of this invention to provide a data processing arrangement which is more economical and requires less physical space than prior art arrangements.

A further object of this invention is to provide an improved buffering system for buffering the digital data output available from sources at varying rates for application to a recorder operating at a substantially higher rate.

A further object of this invention is to reduce the cost and size of associated auxiliary control functions required in recording data at a high speed from data sources which deliver the data at different rates of speed.

Another object of this invention is to provide an improved digital data processing arrangement.

Another object of this invention is to provide improved circuitry for controlling the operation of a recorder in accordance with the status of digital data being circulated in a recirculating storage register coupled to data sources.

Another object of this invention is to provide an improved control arrangement for detecting the status of data being incremented in a storage register in order to coordinate the transfer of data from the data source to the register, and from the register to the recorder.

BRIEF DESCRIPTION OF THE DRAWINGS

The features of the present invention believed to be novel are set forth with particularity in the appended claims. The function itself, however, both as to organization and method of apparatus, together with further objects and advantages thereof, may best be understood by reference to the following description taken in conjunction with the accompanying drawings in which:

FIG. 2 illustrates in part block, part logic diagram form certain details of the arrangement of FIG. 1.

DESCRIPTION OF THE INVENTION

Figure 1:
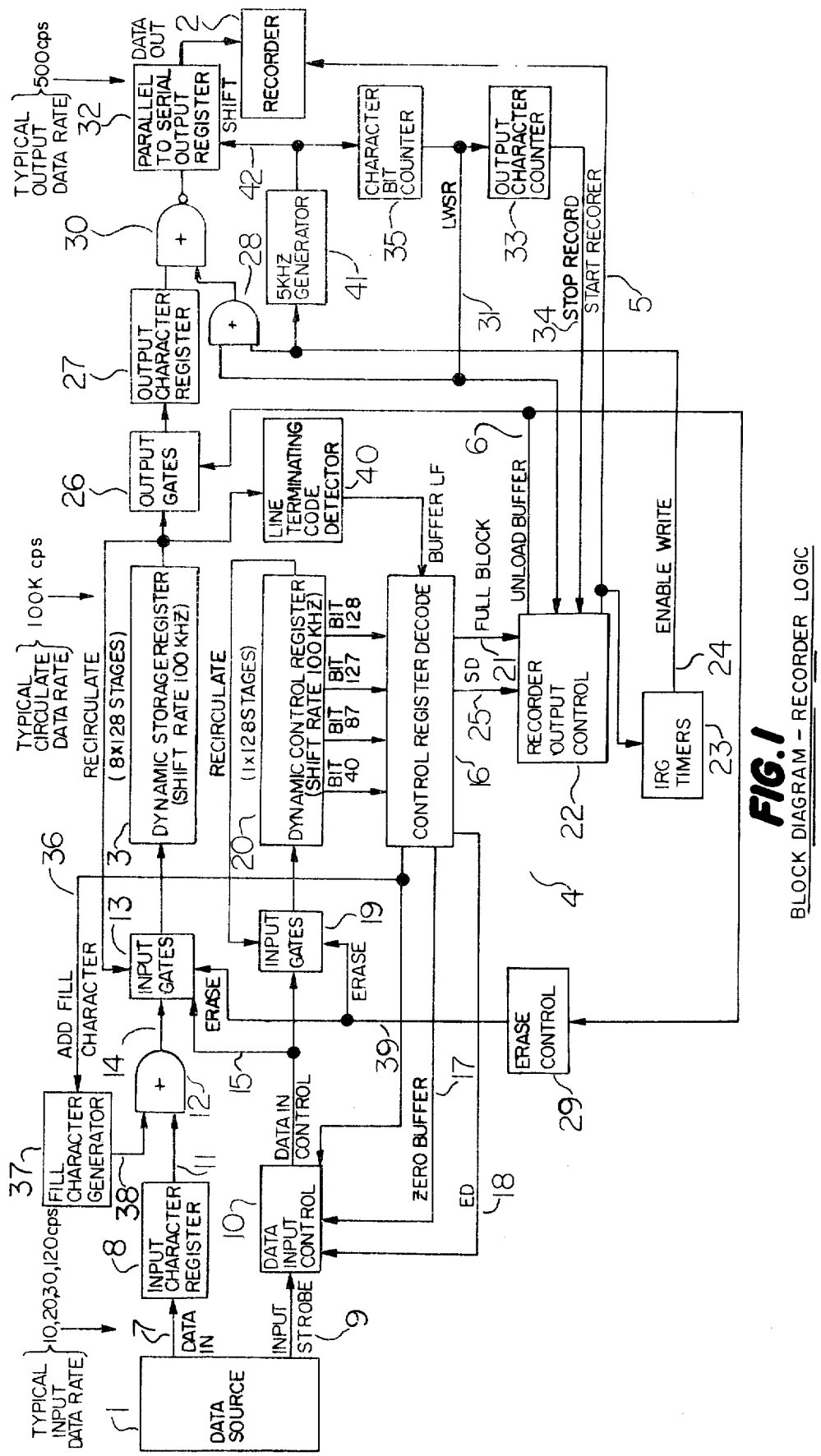
FIG. 1 illustrates in part logic diagram, part block diagram form an arrangement for coordinating the operation of a recorder with the data flow available from a plurality of sources through the medium of a recirculating storage register.

In accordance with one aspect of the invention there is provided a circulating storage register for storing a plurality of coded pulse groups wherein each of said groups represents a character. Means are provided for applying the coded pulse groups from a source to said register at a first rate and for circulating such groups in the register at a second rate. Means are provided for applying groups stored in said register to said recorder for recording the applied groups at a third rate in blocks of a fixed number of characters each. The rates are dimensioned such that the third rate is greater than the first rate but less than the second rate. Means are provided responsive to the presence of one block of characters stored in the register for initiating a recording sequence which comprises starting the recorder to record the groups contained in said one block. Recorders generally require a predetermined start-up period. Means are therefore provided for delaying the application of characters corresponding to said one block from said register to said recorder for recording purposes until the elapse of the start-up time period. The capacity of the register is selected to be greater than one but less than two blocks of characters such that the source is allowed to continue to apply groups in addition to those contained in the one block to the register during the recorder start-up period and during the recording of said one block of characters. Means are provided responsive to one block of characters having been applied to the recorder for halting the application of further characters to the recorder and for stopping the recorder from further recording until the balance of a second block of characters has been stored in the register.

Referring to FIG. 1 there is shown in block diagram form a generalized recording arrangement useful in explaining the present invention. Data is available from a source 1 in the form of coded pulse groups wherein each of the groups represents a character. The source may be a communications terminal, a keyboard or other such source of data where the data may be available at different rates. For example, in a communications terminal data is often-times available at 10, 15, 20, 30, 120, etc., characters per second. Oftentimes it is desirable to record the data available from the sources in block format wherein each block represents a predetermined number of characters. By recording the data in block form provision is made for editing the data prior to recording. The block format also allows the data to be recorded on the medium at a higher density. The block may also correspond to a line length where the recorded data is used to drive a printer for printing characters corresponding to the data. In order to assemble the data into the desired blocks, a buffer 3 is provided which is capable of storing a plurality of coded pulse groups. Control of the application of data from the source to the buffer and from the buffer to the recorder is under the control of a buffer controller 4.

This is shown by a generalized reference arrow 4 and the elements constituting this buffer controller will be described shortly in more detail. Where the data available from the source 1 is available in a continuous data stream, it is desirable to process the data in a continuous manner. In order to accomplish this, the recorder 2 is designed to record characters at a higher rate than the incoming data rate from source 1. In addition, the buffer 3 is designed to store a given plurality of incoming data characters while the controller 4 is adapted to start the recorder recording when a block of characters has been assembled in the register. In accordance with one embodiment of the invention, the storage register 3 is designed to store more than one block of characters but less than two blocks. This results in maximizing the utilization rate of the recorder and minimizing the cost associated with the storage register capacity and associated control electronic circuitry. In one embodiment the recorder was adapted to record at a character rate of 500 characters per second where data was selectively available from a source at 10, 15, 20 or 120 characters per second. The block of characters in one embodiment constituted 88 characters each and the capacity of the buffer 3 was designed to be 128 characters. Data was circulated in the storage register at a shift rate of 100,000 characters per second. The maximum recording rate is related to the data recirculation rate in the register and the capacity of the register as follows:

$$\frac{\text{recirculating rate (Hz)}}{\text{number of register stages}} > \text{recording rate (char./sec.)}$$

When the buffer controller 4 detects that one block of characters has been stored in the storage register 3, a control signal is applied over lead 5 to start the recorder to record the characters available from the buffer register 3. Because of electromechanical limitations in the recorder which may be a cassette tape recorder, a predetermined period of time is required for the recorder to be in position to properly start recording characters. The buffer controller 4 also establishes a control signal over lead 24 for delaying the application of characters to the recorder until the elapse of this start-up time period. The maximum input data rate, the additional register capacity beyond one block and the start-up time for the recorder are related as follows:

additional storage capacity (chars.) > max. input data rate (char./sec.) × recorder start-up time (seconds)

In one embodiment where the maximum input data rate was 120 characters per second, and the start-up time period was 50 milliseconds, the additional buffer capacity was selected to be 40 characters which is greater than the calculated six characters of additionally required capacity. This choice of 40 provided flexibility to accommodate higher maximum input data rate, longer block lengths and extended recorder start-up time periods. The buffer controller 4 also detects when one block of characters has been applied to the recorder for halting the application of further characters to the recorder and for stopping the recorder from recording. The recording process is halted only until the presence of the next full block of characters stored in the register 3 has been detected whereupon the next successive block recording sequence is repeated. By this arrangement, characters may continue to be applied from the source to the register 3 in addition to those contained in the detected one block during both the recorder start-up period and during the actual recording of the detected one block of characters.

The circulating storage register 3 in one embodiment comprised circulating shift register for shifting eight bits of data corresponding to a coded pulse group representing a character in parallel through 128 stages representing more than one block but less than two blocks of characters where a block of characters is represented by 88 characters. The data is circulated or shifted through the register at a rate of 100,000 characters per second rate. Since this circulation rate is so much greater than the incoming data source rate, it is necessary to keep track of the data circulating in the register such that the incoming characters can be inserted into the data stream circulating in the register in consecutive order. To accomplish this there are provided a series of control circuits. Each character available from source 1 is applied over lead 7 in character serial form to the one character capacity, input character register 8. Concurrently an input strobe signal is applied over lead 9 to the data input control register 10. Characters stored in register 8 are applied over lead 11 through an eight bit OR gate 12 and line 14 to the storage register input gates 13. It should be mentioned at this point that while reference will be made to lines, or leads connecting the various elements of the diagram, it is understood that this is intended to also include a plurality of connections as, for example, where the data is available as a plurality of pulses. Thus, the eight bits representing a character available in parallel form on lead 11 for application through the eight OR gates 12. Input gate 13 is normally blocked and is enabled to pass the character available on lead 14 to the circulating storage register 3 upon the application of the data in control signal available on lead 15. The data in control signal is not available on lead 15 until the control register decode circuit 16 has generated either a zero buffer signal on lead 17 or an ED signal on lead 18. The zero buffer signal on lead 17 indicates that there is no signal circulating in the storage register 3 and control register 20 so that the first character available on lead 14 can be gated through gates 13 to the register 3 when the zero buffer signal is applied to the input control circuit 10. On the other hand, if data is already circulating in register 3, the control register decode block 16 determines when the last character has recirculated through the input of register 3 and produces an end data, i.e. the ED signal on lead 18. This causes the control block 10 to generate a data in control signal on 15 for applying the next character available on lead 14 through gate 13 to the input stage of the storage register 3. The details of this will be described shortly. The data in control signal available on 15 is simultaneously applied to the gate 19 to insert a tag bit, represented for example by a logic 1 level signal, to the input stage of the circulating control register 20. The tag bits circulating in the control register are circulated in synchronization with the corresponding characters circulating in register 3. Register 20 includes a corresponding number of stages to that appearing for each of the character bits in the register 3. As will be shortly described, the circulating control register 20 is intended to carry on a number of control functions. For example, the decode of the tag signals circulating in register 20 by the control register decode 16 establishes when to input the next character into the chain of characters circulating in register 3, when to add fill characters and how many to the input stage of the storage register in the event a line terminating code is received prior to entering a full block of characters in register 3, when a block of characters has been entered into the storage register, and when to output the circulating characters to recorder 2 in the same order as they were entered into the storage register. The input gates 13 under the control of data in control signal on 15 continues to apply characters from the source 1 for storage in register 3. Concurrently, tag signals appear in the control register 20 and are circulated synchronously with the corresponding characters circulating in register 3. When the control block 16 detects that a full block of characters has been stored into register 3, it produces a full block signal on lead 21 for application to the recorder control block 22. As will be described shortly, the full block of 88 character signals on lead 21 is obtained by detecting a logic level zero on the lead labeled bit 128 and a logic level 1 state on the leads identified by bit 127 and bit 40. The full block signal on lead 21 applied to recorder control 22 develops a start recorder signal on lead 5 to initiate the start-up of recorder 2. The full block signal 21 also allows the start data SD signal available on lead 25 to generate the unload buffer signal on lead 6 to gate the first character stored in the register 3 available at the output stage of buffer 3 through output gates 26 into output character register 27. The start data SD signal developed on lead 25 occurs as each successive character moves into the final stage of the register 3 and is the next character to be recorded. The SD signal is generated in response to the detection of a zero logic state on bit 128 lead and a logic 1 state on bit 127 lead. When the unload buffer signal is developed on lead 6 to indicate when the next character is to be gated from the register 3 through the gate 26 to the output register 27, a character erase signal is developed on lead 28 for application to the erase control block 29. This block applies erase signals to the input gates 13 and 19 to delete each character which has been applied to the output register 27 by preventing it from being further recirculated in the register 3 and to also delete its associated tag which had been circulating in register 20, thus erasing the character from the storage register. Because of electromechanical limitations in the recorder 2 a predetermined time period is required for start-up, that is, before the recorder is in a proper position to actually begin the recording of data available on its input lead. Thus the data available from the register 3 has to be delayed for the predetermined time period. This is accomplished by causing the start recorder signal available on lead 5 to also initiate the inter-record gap timer circuit 23 which, after a predetermined time period, produces an enable write signal on lead 24 which is applied through OR gate 28 to NOR gate 30, enabling the first character stored in register 27 to be applied to register 32 for conversion from parallel to serial bit form before application to the recorder 2. In one embodiment the enable write signal available on lead 24 was delayed to occur 50 milliseconds after the start record signal appearing on lead 5.

The enable write signal enables the shift generator 41 to apply shift pulses over lead 42 to register 32 shifting the character bits serially into recorder 2. Shift pulses from lead 42 are also applied to counter 35 causing the counter to count the number of bits in each character passed to recorder 2. After each character is passed, the counter 35 generates a load write shift register LWSR signal on lead 31 to increment output character counter 33 and also gate successive characters from 27 to output register 32 through gates 28 and 30. Each LWSR signal also enables control 22 to allow SD signal 25 to provide an unload buffer signal on lead 6 for gating the following characters to be recorded from the storage register through gate 26.

Each successive LWSR signal is generated in response to the completion of the transfer of all of the serial bits of the character developed in register 32 to the recorder 2. So far we have described how each character in a block is gated in succession and erased from the storage register 3 to the output character register 27.

This process of recording continues until the output character counter 33 counts up a full block or 88 characters as having been transferred from the parallel to serial shift register 32 to the recorder 2. Upon reaching the count of 88 the output character counter 33 generates a stop recorder signal which is applied over lead 34 to recorder control 22 to reset the control function. This results in a stop signal being applied over lead 5 to the recorder 2 to stop its recording operation and to halt unload buffer signals from being applied over lead 6 to the output gate 26.

It should be noted that because the capacity of the register was of the order of 128 characters, that is, representing greater than one but less than two blocks of characters, characters may continue to be applied from the source 1 to the register 3 in addition to those characters contained in the first block during both the recorder start-up period as well as during the recording of the entire block of characters represented by the signal developed on lead 21. This results in a maximum efficiency of circuit utilization and obviates the need for the use of two circulating shift registers with attendant switching circuitry for buffering the data being applied from a source to a recorder.

The invention has been described assuming that full blocks of data were always available from the data source 1 for application to the recorder. The recorder is required to record data in fixed blocks of 88 characters for various reasons. Thus where it is desirable to record lines of varying length printable text as data blocks which number less than the 88 characters, it is necessary to provide fill characters to complete the block of data. Under these circumstances, the last character in the block received from source 1 would be a line feed character. When this first appears at the output of the register 3, it is detected by line terminating code detector 40 which applies a buffer line feed signal to the control decode block 16. When the last character stored in the register appears at the final stage of register 3, it will be indicated by logic level 1 signal being detected on the bit 128 lead of register 20 and the logic zero signal on the bit 127 lead providing an end of data ED signal. When the end of data signal and the buffer line feed signal occurs simultaneously, the control decode block 16 produces an add fill character signal on lead 36. The signal applied to fill character generator 37 causes fill characters to be applied to OR gate 12 over lead 38. The data input control block 10 also responds to the add fill character signal 36 to provide the data in control signal 15 which enables input gates 13, thus gating the fill characters into the storage register 3 to form a full block of data. The fill characters are non-printing characters and merely serve the function of completing a block of data and reserving space for possible editing purposes allowing line expansion. The fill characters generated by 36 are entered into register 3 at the recirculation rate of registers 3 and 20. As fill characters are entered into the storage register, corresponding tag bits are entered into the control register 20 by the fact that add fill character signals applied to data input control block 10 causes data in control signals to be applied via gates 19 to the register 20. Thus the fill characters as they are added move progressively through the register along with their corresponding tag bits in register 20. When register 20 indicates the next logic level 1 state signal on bit position lead 87, a full block of data including fill characters has been introduced into register 3. The signal on lead bit 87 applied to decode block 16 terminates the providing of the add fill character signals. Each block of data recorded then will constitute a full block either in terms of printable and control characters or such characters together with fill characters. It should be noted that rather than sensing the states of the signals available on the various stages of the register 3, the control functions are carried out in response to sensing the signal logic states at predetermined bit positions of the control register. This approach places no restriction on the bit combinations of code groups available from source 1 and achieves the required control function in a versatile and efficient manner. In this way a single bit register of 128 stages, which is equal to the number of character storage stages of the signal storage register, provides a simple way of initiating the various required control functions.

Referring now to FIG. 2, certain elements of FIG. 1 are illustrated in greater detail. Wherever possible the reference numeral notation used in FIG. 1 has been retained in FIG. 2. Thus for example, the recirculating storage register 3 is shown as including eight storage registers each handling one bit each and containing 128 stages. For purposes of shifting each data bit through the successive stages of a register, phase 1 and phase 2 clock pulses are provided from a source as shown in FIG. 2. This source produces phase 1 and phase 2 clock or timing pulses occurring at a 100,000 kilohertz rate with the pulses phase displaced from one another in a non-overlapping manner. In this way when data in control signal 15 is a logic one input data being supplied to the NOR gate 50 appears at the NOR gate 51 and is gated through the field effect transistor (FET) 52 to the NOR gate 53 at a phase 2 clock time. At the next phase 1 time this bit available at the input of NOR gate 53 is transferred by the FET 54 to the NOR gate 55. The discussion thus describes one stage of the dynamic storage register. The remaining stages of the bit 2 register operate in the same manner such that the bit is transferred through the register stages at the 100,000 kilohertz rate in response to the occurrence of phase 1 and phase 2 clock pulses. The dynamic logic convention implies that all logic signals are propagated at $\phi 2$ clock time and all gates are coupled by $\phi 2$ clock except where $\phi 1$ is shown. The remaining registers associated with bits 2 through 8 operate in the same manner as has been described with respect to the bit 1 register. Suffice it to say that in response to each bit being applied to its input data line, the bit is transferred through the successive stages to its output lead 56 whereupon it is applied to its output gate 26 and over a feedback loop to its NOR gate 57 for recirculation through the register. Reference numeral 10 identifies the data input control block which stores an input strobe signal available on lead 9 from data source 1. Data input control is in the form of a latch circuit for storing the occurrence of a strobe signal until such time as the data in the register 3 has recirculated through the input stage and the register is ready to receive the next character associated with the input strobe. The ED, end of data, signal is generated when the last character stored in memory has circulated through the input stage of the register. Thus, NOR gate 58 responds at phase 1 time to the latch signal indication on lead 59 and the ED signal available on lead 60 to provide a data in control signal on lead 15 for enabling NOR gate 50 to input the input data applied to NOR gate 50 into the input stage of the register and inhibit NOR gate 57 from recirculating during the data input time period. The data bits of successive characters are entered in this same manner into the input stage of the register at the proper position in the stream of data bits circulating in each of the respective bit stages of the registers.

The dynamic control register 20 is shown to be similar to that as the bit 1 register previously described in connection with register 3. The data in control signal 15 is applied by the input gate 19, comprising a NOR gate 61 and an erase gate 62, to the input stage of the control register at the appropriate time such that the tag bit associated with the data bits inserted in stage 1 circulate through the register 20 in synchronism with that of the data bits circulating in register 3. As previously mentioned, the full block signal 21 detected at the bit 40 output lead and the SD signal of control register 20 results in an 88 character signal being generated. This 88 character or full block signal allows the start data SD signal available on lead 25 to produce the first unload buffer signal on lead 6 to gate the first character available at the output stage of buffer 3 through output gates 26 into output character register 27. The unload buffer signal 6 also resets the unload buffer function until the next LWSR signal 31 sets the control indicating that the previous character removed from register 3 is now being recorded and the next character is to be removed from the storage register 3 into the output character register. The start data signal developed on lead 25 occurs as each successive character moves into the final stage of register 3. The SD signal is generated in response to the detection of a zero level state on bit 128 lead and a level 1 state on bit level 127 lead. As previously mentioned, when the unload buffer signal is developed on lead 6 to indicate when the next character is to be gated from the register 3 through the gate 26 to the output register 27, a character erase signal is developed on lead 28 for application to the erase control block 29. This block applies erase signals to the input gates 13 and 19 to delete each character which has been applied to the output register 27 by preventing it from being further recirculated in the register 3 and also delete the associated tag which has been circulating in register 20. The enable write signal developed on lead 24 after a given time period by timer 23 is applied through OR gate 28 to OR gate 30 enabling the first character stored in register 27 to be applied to register 32 for conversion from parallel to serial bit form. As previously mentioned, the first LWSR signal available to NOR gate 30 is generated in response to the timing pulse developed on lead 24. Each successive LWSR signal is generated by the character bit counter 35 in response to the completion of the transfer of all of the serial bits of the character developed in register 32 to the recorder 2.

This process of recording continues until the output character timer 35 counts up a full block or 88 characters as having been transferred from the parallel to serial shift register 32 to the recorder 2. Upon reaching the count of 88 the output character register 33 generates a stop record signal which is applied over lead 34 to the start recorder function which resets the record control function. This results in a stop signal being applied over lead 5 to the recorder 2 to stop its recording operation and to halt unload buffer signals from being applied over lead 6 to the output gate 26 by inhibiting unload buffer NOR gate 63. The add fill function of control register decode block 16 operates in a manner similar to that described with respect to in a data input control function 10. That is, it operates as a latch to provide fill characters such that upon the generation of an ED signal and buffer LF signal, the add fill character control signal 36 is provided to gate fill characters available as input data on 14 through the input gates 13 immediately following recirculating the previously entered characters through the first stage of the storage register 3. As fill characters are entered successively into register 3 and their corresponding tag bits are entered into the control register 20, the previously entered tag bits are being shifted through the control register 20. When the first tag bit shifts into the output of stage 87 of the control register, a signal bit 87 output is provided from the control register to reset the add fill control function, thus stopping the adding of further fill characters into the storage register. There are now a full block or 88 characters in the storage register by the fact that fill characters and their corresponding tag bits were added at the input of the storage register until the first character and its corresponding tag bit has shifted to the output of stage 87 of the register. One additional fill character is added after the bit 87 output signal is generated providing a total of 87 +1 = 88 characters in the storage register before the add fill function is reset by the bit 87 output control signal.

The zero buffer function operates as follows. Bit 128 output of the control register 20 is applied to the set input of the zero buffer latch. If any characters are circulating in the storage register a corresponding tag bit will be circulating in the control register represented by a logic one signal which continually sets the zero buffer latch. The 1.6 ms signal is a pulse which samples the status of the zero buffer latch every 1.6 milliseconds at the NOR gate 64. If the zero buffer latch is set representing the fact the tag bits are in the control register, the zero buffer signal at lead 17 is not produced, and the latch is reset. If however, the latch is not set representing the fact that no tag bits are circulating in the control register, the zero buffer signal at lead 17 will be produced every 1.6 millisecond by the 1.6 ms pulse. If only one character was circulating in the storage register, the zero buffer latch would be set every 1.28 millisecond since there are 128 storage register stages and the shift rate is 100,000 Hz or 128 × 1/100,000 = 1.28 $10^{-3}$ sec = 128 milliseconds. Therefore the zero buffer sample pulse must be equal to or greater than 1.28 milliseconds. The 1.6 millisecond signal was easily available from the clock timing generator and was therefore used as the sample pulse for the zero buffer function.

While reference has been made to registers 3 and 20 as being dynamic storage registers, it should be recognized that these are intended to include any form of dynamic memory or storage device such as a delay line or incremented shift registers.

While the invention has been described with particular reference to the construction shown in the drawings, it is understood that further modifications may be made without departing from the true spirit and scope of the invention, which is defined by the claims appended hereto.

What I claim as new and desire to secure by Letters Patent of the United States is:

1. In combination a source of coded pulse groups available at a first maximum rate wherein each of said groups represent a character, a circulating storage register, means for storing a plurality of coded pulse groups in said register comprising means for applying said coded pulse groups from said source to said register at a first rate and for circulating such groups in said register at a second rate, a recorder, means for applying groups stored in said register to said recorder for recording such last named applied groups at a third rate in blocks wherein each of said blocks comprises 88 groups each, said third rate being greater than said first rate but less than said second rate, means responsive to the presence of each block of groups stored in said register for initiating a recording sequence comprising means for starting said recorder to record the groups contained in said one block, said recorder requiring a predetermined start-up period, means for delaying the application of groups corresponding to said one block from said register to said recorder for recording until the elapse of said start-up time period, means for enabling said first mentioned means to continue to apply groups in addition to those contained in one block to said register during said recorder start-up period and during the recording of said one block comprising the capacity of said register being of the order of 128 groups, and means responsive to each block of groups applied to said recorder for halting the application of further groups to said recorder from said register and for stopping said recorder from recording.

2. An arrangement according to claim 1 further comprising means responsive to the presence of each successive block of groups stored in said register for resuming the application of such successive blocks to said recorder and the starting of said recorder for initiating the recording thereof.

3. In combination a source of coded pulse groups available at a first maximum rate wherein each of said groups represent a character, a circulating storage register, means for storing a plurality of coded pulse groups in said register comprising means for applying said coded pulse groups from said source to said register and for circulating such groups in said register at a second rate, a recorder, means for applying groups stored in said register to said recorder for recording such last named applied groups at a third rate in blocks wherein each of said blocks consists of a fixed plural number of groups, said third rate being greater than said first rate but less than said second rate, means responsive to the presence of each block of groups stored in said register for starting said recorder comprising said recorder requiring a predetermined start-up period, and means for applying groups from said register to said recorder after the elapse of said start-up period, the capacity of said register being greater than one but less than two blocks of groups for enabling coded pulse groups in addition to one block to be applied to said register from said source for storage during said recorder start-up period and during the recording of said one block, and means responsive to the application of each block of groups to said recorder for halting the application of further groups to said recorder from said register and for stopping said recorder.

4. An arrangement for coupling data between a source of coded pulse groups each representing a character and a recorder for recording such groups in blocks on a record medium wherein each of said blocks consists of a fixed plural numeral N of groups comprising a first recirculating coded pulse group register, a second recirculating tag signal register, means for entering said groups from said source into said first register at a first rate and for recirculating such groups at a second rate, means for providing a respective tag signal associated with each coded pulse group entered into said first register, means for entering said tag signals into said second register and for recirculating said tag signals in synchronism with the recirculation of the associated groups in said first register, control means coupled to said second register for sensing each block of N groups stored in said first register for initiating a recording sequence comprising means for applying the groups contained in said one block to said recorder for recording the same, the capacity of said first and second registers each being M characters and M signals respectively where M is greater than one but less than twice N such that groups in addition to one block continue to be entered into said first register from said source during said recording of said one block, means coupled to said second register for sensing that one block of N groups has been applied from said first register to said recorder for blocking the application of further groups to said recorder until said control means senses the storage of a succeeding block of groups in said first register.

5. An arrangement according to claim 4 wherein said control means is coupled to the M, M−1 and M−N stages of said second register.

6. An arrangement for coupling data between a source of coded pulse groups representing characters including a line terminating character and a recorder for recording such groups in blocks of a plurality of N characters on a record medium comprising a first recirculating coded pulse group register, a second recirculating tag signal register, means for entering said groups into said first register at a first rate and for recirculating such groups at a second rate, means for providing a respective tag signal associated with each group entered into said first register, means for entering said tag signals into said second register and for recirculating said tag signals in synchronism with the recirculation of the associated groups in said first register, means for providing coded pulse groups representing fill characters, means coupled to said first register for sensing that a group representing a line terminating character has been stored in said first register, means responsive to said groups representing a sensed line terminating character and coupled to said second register for sensing that an incomplete block of groups has been stored in said first register for applying provided groups representing fill characters to said first register for storage therein, means coupled to said second register for sensing that one block of groups has been stored in said first register for initiating a recording sequence comprising means for applying the groups contained in said one block to said recorder for recording the same, the capacity of said first and second registers being greater than one but less than two blocks of groups such that groups in addition to said one block continue to be entered into said first register from said source during said recording of said one block, means coupled to said second register for sensing that one block of groups has been applied from said first register to said recorder for blocking the application of further groups to said recorder, and means coupled to said second register for sensing the storage of each successive block of groups in said first register for resuming the application of further groups to said recorder for initiating each successive recording sequence.

7. An arrangement for coupling coded pulse groups representing characters available from a source to a recorder for serially recording such groups in blocks on a record medium wherein each of said blocks consists of a fixed number of N characters comprising a first memory and a second signal memory, means for entering each of said groups into said first memory, means for circulating said entered groups as a function of time in said memory, means for providing a respective tag signal associated with each coded pulse group entered into said first memory, means for entering each said tag signal into said second memory, means for circulating said entered tag signals in said memory in synchronism with the circulation of the associated groups in said first memory, first means coupled to said second memory for sensing that one block of N groups has been stored in said first memory for providing a first control signal, second means responsive to said first control signal for applying the groups contained in said one block serially to said recorder of serially recording the same and for erasing such groups from said first memory, the capacity of said first and second memories each being M characters where M is greater than one but less than two blocks of N characters such that groups in addition to said one block continue to be entered into said first memory from said source during said recording of said one block, and third means coupled to second means for sensing that one block of groups has been applied from said first memory to said recorder for inhibiting the application of further groups to said recorder, until the next group of N characters representing a block of characters has been entered into said first memory.

8. In combination a source of coded pulse groups available at a first maximum rate wherein each of said groups represent a character, a circulating storage register means storing a plurality of coded pulse groups in said register comprising means for applying said coded pulse groups from said source to said register and for circulating such groups in said register at a second rate, means for applying groups stored in said register to said recording for recording such applied groups at a third rate in blocks wherein each of said block consists of a fixed number of groups, said third rate being greater than said first rate but less than said second rate, means responsive to the presence of one block of groups stored in said register for starting said recorder, said recorder requiring a predetermined start-up period, means for applying characters from said register to said recorder after the elapse of said start-up period, the capacity of said register being of the order of one block of groups plus additional capacity for groups that may be applied during the recorder start-up period such that groups in addition to said one block continue to be applied to said register at said first rate from said source during said recorder start-up period and during the recording of said one block at said third rate, and means responsive upon the application of one block of groups to said recorder for halting the application of further groups to said recorder until a succeeding full block of has been applied to said register.

9. An arrangement for coupling coded pulse groups representing characters available from a source to a recorder and for serially recording such groups on a record medium in signal blocks wherein each block consists of a plurality of N groups comprising a first information memory and a second status and control memory, means for entering each of said coded pulse groups in bit parallel, character serial format into said first memory at a first rate, means for circulating said entered coded pulse groups in said first memory at a second rate, means for providing a respective tag bit signal associated with each coded pulse group entered into said first memory, means for entering each of said provided tag signals into said second memory at said first rate in bit serial format, means for circulating said entered tag signals in said second memory at said second rate in synchronism with the circulation of the associated groups in said first memory, first means coupled to a given bit position in said second memory for sensing when each single block of N groups has been entered into said first memory for providing an associated first control signal, second means responsive to each of said first control signals for starting the recorder and for applying the groups contained in the associated block serially to said recorder after a given recorder start-up period for serially recording the same and for erasing such last named groups from said first memory, the character capacity of said first memory being of the order of one block of groups plus additional group capacity for groups that are entered into said first memory during the recorder start-up period such that coded pulse groups in addition to that contained in a single block continue to be entered into said first memory at said first rate from said source during said recorder start-up period and during the recording of said one block at said third rate, the bit capacity of said second memory being equal to the group capacity of said first memory, and third means coupled to said second means for counting the number of groups applied from said first memory to said recorder for providing a second control signal in response to a group count equal to the number of groups in a single block, and means responsive to said second control signal for inhibiting the application of further coded pulse groups to said recorder until a succeeding group of N groups representing a single block of groups has been entered into said first memory.

10. An arrangement for coupling coded pulse groups representing characters available from a source to a recorder and for recording such groups on a record medium in blocks wherein each block consists of a given number of groups comprising a first memory and a second memory, means for entering each of said coded pulse groups from source into said first memory at a first rate, means for circulating said entered coded pulse groups in said first memory at a second rate, means for providing a respective tag bit signal associated with each coded pulse group entered into said first memory, means for entering each of said provided tag signals into said second memory, means for circulating said entered tag signals in said second memory at said second rate in synchronism with the circulation of the associated groups in said first memory, first means coupled to a given position in said second memory for sensing when a predetermined number of blocks has been entered into said first memory for providing an associated first control signal, second means responsive to each of said first control signals for applying the groups contained in the associated predetermined number of blocks to said recorder for recording the same and for erasing such last named groups from said first memory, the character capacity of said first memory being of the order of said predetermined number of blocks of groups plus additional group capacity for groups that are entered into said first memory during the recording of said predetermined number of one block at said third rate, the tag signal capacity of said second memory being equal to the group capacity of said first memory, and third means coupled to said second means for counting the number of groups applied from said first memory to said recorder for providing a second control signal in response to a group count equal to said given number of groups in a block, and means responsive to said second control signal for inhibiting the application of further coded pulse groups to said recorder until a succeeding given number of groups representing said predetermined number of groups in a block has been entered into said first memory.

* * * * *